3,195,944
VEHICLE WALL BRACING MEANS
Lawrence C. Simmons, Cleveland, Ohio, assignor to Cleveland Technical Center, Inc., Cleveland, Ohio, a corporation of Delaware
Filed Mar. 25, 1964, Ser. No. 354,534
6 Claims. (Cl. 296—28)

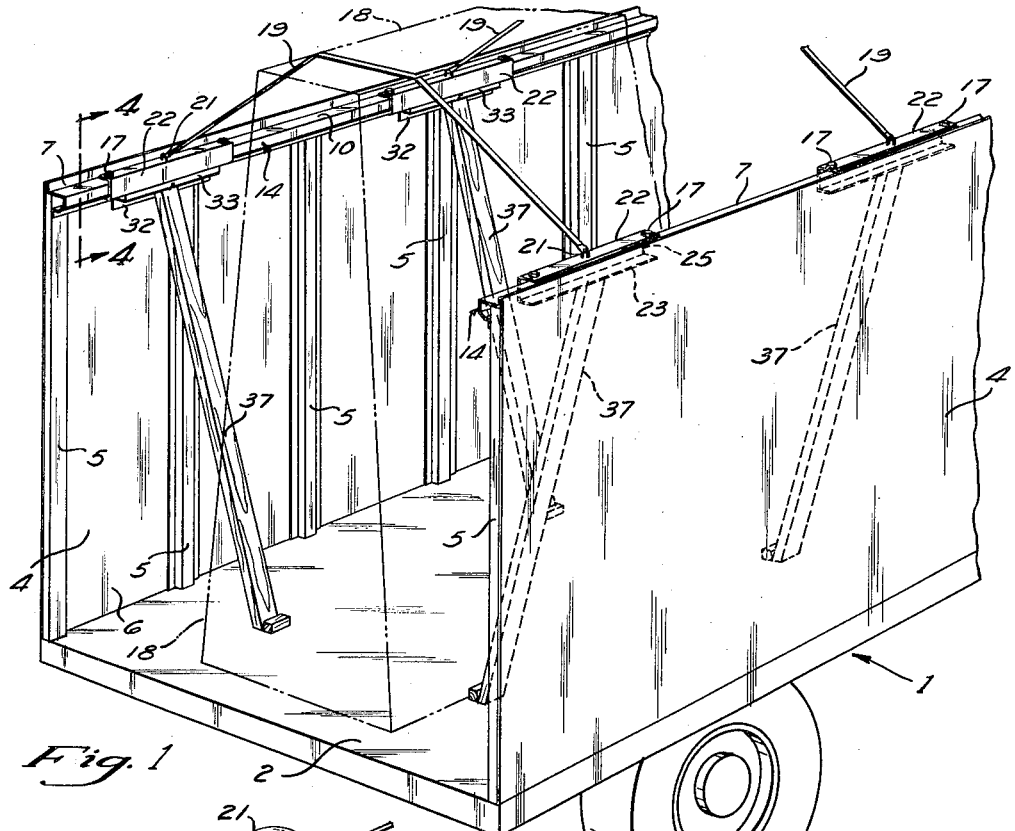
Fig. 1
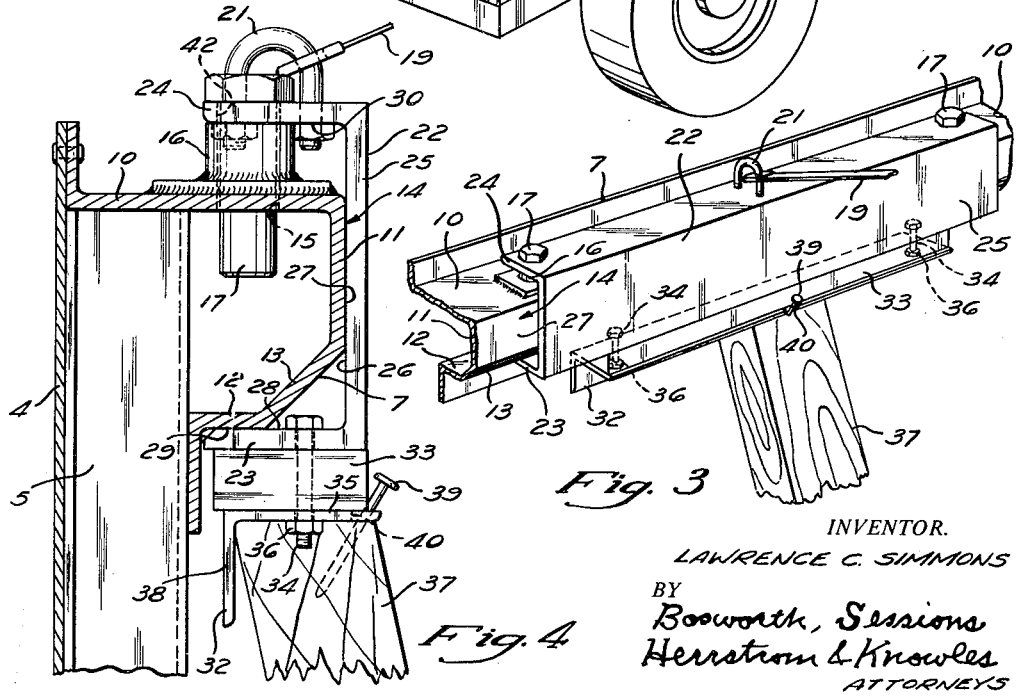
Fig. 3
Fig. 4
INVENTOR.
LAWRENCE C. SIMMONS
BY Bosworth, Sessions
Herstrom & Knowles
ATTORNEYS INVENTOR.
LAWRENCE C. SIMMONS
BY
Bosworth, Sessions
Herrstrom & Knowles
ATTORNEYS

United States Patent Office 3,195,944
Patented July 20, 1965

This invention relates to means for bracing the sidewalls of open-top vehicle bodies, and more particularly to such means permitting the bracing of the sidewalls when the loads carried by the vehicle body extend a substantial distance above the sidewalls.

Open-top vehicle bodies, such as open-top truck or trailer bodies, are widely used. They are advantageous when it is desired to load the vehicle from the top, as by overhead cranes for packages or articles, or by chutes or the like for unpackaged bulk items. They are also advantageous for transporting loads that are higher than can pass through the rear doorways of roofed vehicle bodies.

Heretofore, it has been the practice to use spreader bars connected to top edges of the sidewalls to brace, and to prevent transverse movement of, the vehicle body walls after the bodies have been loaded, and during transportation of the bodies. These spreader bars, in general, have been arched or bowed upward slightly so as to permit the transportation of loads only a few inches taller than would ordinarily pass through the rear doorway of the standard roofed vehicle body, and to support load-sheltering tarpaulin covers so that they can shed rain.

Moreover, these spreader bars are relatively expensive and, hence, must be retained for reuse after removal; this involves problems of either storing the removed bars at terminals until needed on return trips, or transporting the bars to return them to point of origin, with the attendant problems of inventorying the bars and preventing their loss or theft.

Often it is necessary to transport loads that are considerably taller, even several feet taller, than the sidewalls of an open-top vehicle body. In such case, it is impossible to use the conventional slightly arched spreader bars to brace the sidewalls, since they will not clear the load. It is often desired in transportation activities of common or contract carriers to transport, in open-top vehicle bodies having open backs or rear doors, loads of various heights including those extending a considerable distance above the sidewalls of the vehicle bodies, yet it is impractical and expensive to manufacture, stock, transport and account for a wide variety of spreader bars adapted to be used with loads of widely varying heights. It would be impractical to standardize on bars to clear loads of maximum heights since this would add to the cost of all the bars as well as to the cost of covering tarpaulins because of the enlarged areas thereof required.

The rapidly increasing feasibility of transporting loads considerably higher than the heights of conventional truck and trailer sidewalls intensifies the need for means for bracing the sidewalls of open-top vehicles that is free of these disadvantages, inexpensive, easily installed and removed, and capable of handling loads of various heights. These improved possibilities of transporting tall loads occur because of increased under-bridge clearances provided on new superhighways, and because the piggy-back methods of transporting loaded truck or trailer bodies on railroad flatcars make possible the transportation of taller loads for longer distances than is possible over ordinary roads. Major railroads have been designing and modernizing their rights of way to permit handling of higher loads on their tracks. On many railroads it is now possible to transport for long distances loads more than eleven feet tall mounted on truck trailer bodies carried piggy-back on flatcars.

An object of the present invention is the provision of sidewall bracing means for open-top vehicle bodies that can be used to brace the sidewalls when a wide variety of loads is carried in a vehicle body, ranging from those which are not as tall as the sidewalls to those extending for several feet above the sidewalls, the maximum limit being determined by roadway clearances. Another object is the provision of such means that can be readily installed on standard vehicle bodies, without modification or change thereof, and that can be readily removed from such vehicle bodies when desired. Another object is the provision of such means that can be manufactured and installed at low cost. A further object is the provision of such means that may, if desired, be made of readily available materials and costing so little that it can be discarded if desired, although the more expensive parts thereof can be of such small size that they can be retained in a compact space. A further object is the provision of means of this type that will also brace tall loads against overturning forces.

These and other objects of the invention will become apparent from the following description of a preferred embodiment of the invention in connection with the accompanying drawings in which:

FIGURE 1 is a perspective view of one end of an open-top automotive trailer, showing in broken lines a tall load that extends for a considerable distance above the sidewalls of the vehicle body, and means embodying the invention for bracing the sidewalls and the load;

FIGURE 3 is a perspective of a portion of a top rail of a sidewall of the vehicle body of FIGURES 1 and 2, also showing the upper portion of one of the brace members forming part of the illustrative embodiment of the invention; and FIGURE 4 is a cross section to an enlarged scale along line 4—4 of FIGURE 1.

Figure 2:
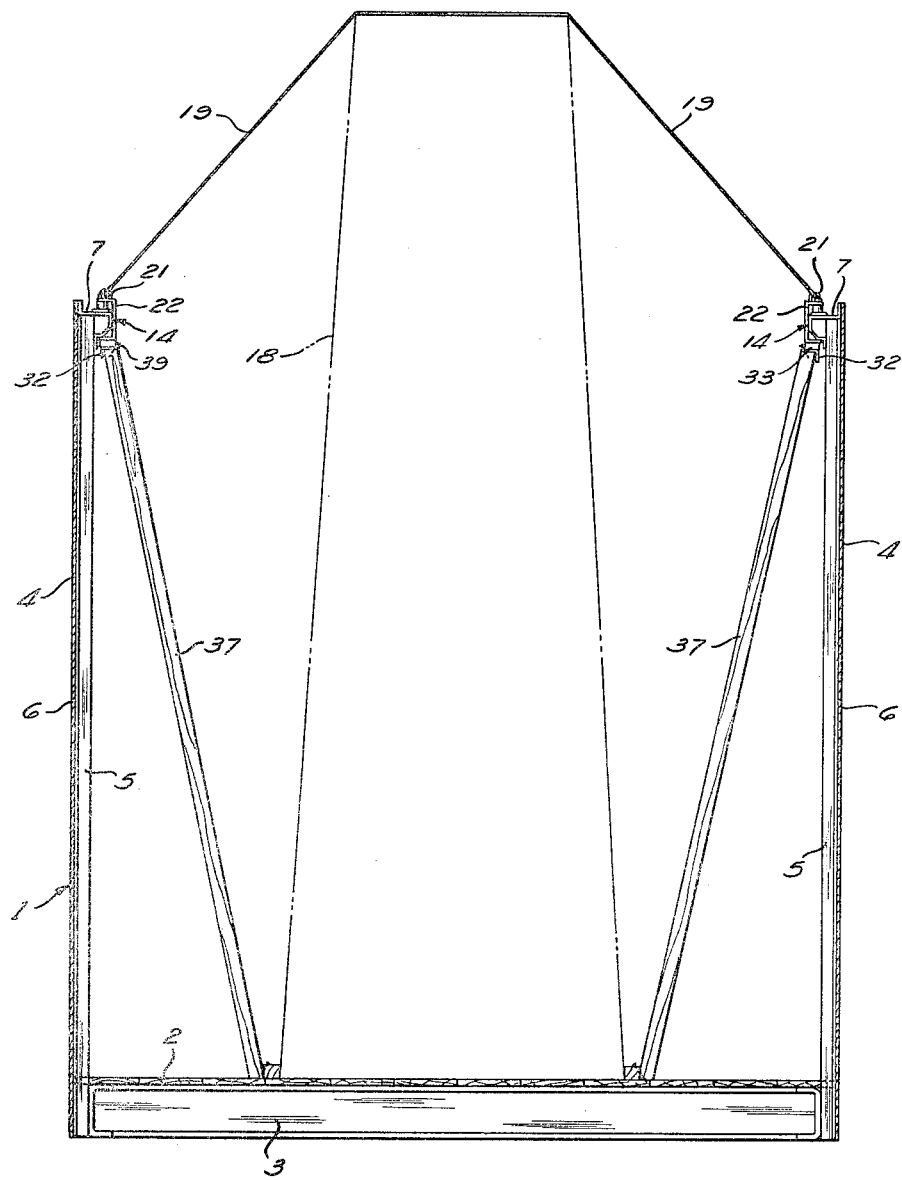
FIGURE 2 is a cross section of the vehicle body of FIGURE 1, showing in more detail the means embodying the invention for bracing the sidewalls and the load.

In the drawings, numeral 1 designates a truck trailer body having a floor 2, formed of wood or similar material that is carried by floor frame 3, and sidewalls 4 made up of vertical side posts 5 that support sidewall sheathing 6 and at the lower ends are fixed to floor frame 3 and at their upper ends carry longitudinally extending rails 7.

These rails 7, a cross section of one of which is shown in FIGURE 4, are formed of rolled or extruded metal sections as shown in FIGURES 3 and 4, each section comprising a generally horizontal top wall 10 that rests on the tops of the side posts 5, an inner generally vertical wall 11 displaced inwardly from the side posts 5, a generally horizontal bottom wall 12, and preferably an inclined clearance-providing wall 13 connecting the bottom wall 12 and vertical wall 11, all of which walls extend substantially the full length of the rail 7. The portion of the top wall 10 extending inwardly of the vehicle body side posts 5, the bottom wall 12 and the vertical wall 11 thus define an inwardly projecting flange portion, generally designated by 14, that is thus affixed at the upper edges of the sidewalls. This portion of the top wall 10 of each rail 7 also has spaced openings 15 along its length, each of these openings being surrounded by a collar 16 fixed to the top wall 10 to reinforce it and to prevent tilting of a pin such as pin 17 when it extends through the collar and the opening 15 in the top wall 10. Each top rail 7 with its spaced opening 15 and collar 16 is designed detachably to secure conventional spreader bars (not shown) having downwardly extending ends or pins that drop through the collars 16 and openings 15 and locate the spreader bars firmly against longitudinal or lateral movement relative to the rails 7.

All of the structure described heretofore, except pins 17, is conventional.

Reference numeral 18 designates a load, shown in broken lines to permit the invention to be more clearly depicted. It outlines a load that may constitute a number of sheets of plate glass on the order of eleven feet wide and longer in length, that are supported in a conventional glass-carrying rack resting on the bottom of the truck. Strands 19, as will be described in more detail later, pass over and bear firmly against the top of the rack forming part of the load and are connected at their outer ends to U-bolts 21 fixed to main bearing member 22.

Each bearing member 22 comprises a piece of metal of rolled or extruded channel-shaped cross section that extends for a substantial portion of the length of one of the top rails, each bearing member being 26″ long in the illustrated embodiment and extending over two adjacent holes 15 and their collars 16. Each channel-shaped member 22 comprises lower and upper flanges 23 and 24 rigidly joined by a web 25; the cross sectional proportions of member 22 are so chosen that the inner face 26 of web 25 bears against the outer face 27 of the vertical wall 11 of the top rail 7; the inner face 28 of the lower flange 23 of member 22 bears against the bottom face of bottom wall 12 of the rail 7; and the inner face 30 of the upper flange 24 of bearing member 22 clears the top of the two adjacent collar portions 16 of the rail 7 that are spanned by the bearing member 22.

An auxiliary bearing member 32 is disposed below and connected to the main bearing member 22, being preferably separated therefrom by a resilient pad 33 of foam rubber or the like. Bolts 34 extend through the lower flange 23 of main bearing member 22 and through an upper horizontal flange 35 of auxiliary bearing member 32 as well as through pad member 33; these bolts 34 and nuts 36 thereon secure member 32 transversely relatively to main bearing member 22 and hold member 32 onto bearing member 22.

A brace member 37, preferably a piece of 2″ x 4″ lumber, extends between auxiliary bearing member 32 and the floor 2 of the vehicle body, at a suitable angle, about 12° from the vertical in the illustrated embodiment, sufficient to provide the desired outwardly directed transverse bracing of the sidewalls. The lower end of the brace member 37 is cut to fit closely against the floor 2, and the upper end is cut to fit closely and bear against the underside of flange 35 of member 32 and against vertical flange 38 of member 32. The upper end of brace member 37 is locked against movement longitudinally and transversely of member 32 by the nail 39 extending through a slot 40 in the horizontal flange 35 of auxiliary member 32. The lower end of brace member 37 is secured against movement transversely of floor 2 by being nailed to the floor. The brace member 37 is positioned with its top end located centrally of the length of auxiliary bearing member 32, so that the force exerted by brace member 37 is distributed equally along the length of auxiliary bearing member 32 and main bearing member 22.

The U-bolt 21 fixed to the top of main bearing member 22 is also located centrally of the length of main bearing member 22 so that the force exerted by strand 19 on the U-bolt 21 is equally distributed along the length of member 22. This force is evently transmitted to the rail 7 on which member 22 is mounted by the pins 17 that pass through two holes 42 in the top flange of member 22 and through two adjacent collars 16 and holes 15 of rail 7. The holes 42 are equidistantly spaced from the U-bolt 21 on member 22 and the notch 40 on member 32 which determines the location of brace member 37 relative to main bearing member 22.

Preferably, as illustrated, there is an assemblage comprising a main bearing member 22, pad 33, auxiliary bearing member 32, and brace member 37 located directly opposite the corresponding assemblage bracing the opposite wall of the vehicle body. As many of these assemblages are used on each wall as are desired for proper bracing purposes, consistent with the number and spacing of holes 16 through the top rails of the sidewalls.

The strands 19, each of which may be conventional steel strapping connected at its ends in a conventional manner to the U-bolts 21 of opposite bearing member 22 to draw the upper portions of the sidewalls 4 of the vehicle body toward each other, against the resisting forces provided by the brace members 37. The strands 19 are in tension, whereas the brace members 37 are in compression. Although the strand members are shown as passing over the load 18 it is obvious that if the top of the load was below the tops of the sidewalls, the strand members 19 would and could extend substantially horizontally and still form part of the system bracing the sidewalls.

It is obvious that, either before or after the load has been put on the floor of the trailer, the main bearing members 22, preferably with the pad members 33 and auxiliary bearing members 32 installed thereon, may be easily put in place on the side rails 7 at the top edges of sidewalls 4 of the vehicle body, merely by locating them and dropping headed pins 17 into place through openings 42 in the top flange of main bearing member 22, the collar members 16, and the openings 15 in the top wall of the rail 7. The brace member 37, which preferably has been previously cut to the proper length with its ends properly shaped, can then be installed merely by nailing it to the floor of the truck and by driving a nail 39 into the upper end of the brace member in the slot 40 of the auxiliary member 32. Each strand 19 can then be installed and tightened as required. After all the bracing means have been thus installed, each tightened strand 19 exerts tension forces directed inwardly of the side walls 4, which are resisted by outwardly directed pushing forces exerted by the oppositely disposed brace members 37. Each auxiliary bearing member 32 and its associated resilient pad member 33 distribute the force exerted by a brace member 37 over a major portion of the area and length of main bearing member 22, and this force is distributed by the lower flange 23 and vertical wall 25 of member 22 to its associated rail 7 over a substantial portion of the area and length of the rail. Auxiliary member 32 and pad 33 also prevent transmission of damaging vibrations or shocks from floor 2 to the sidewalls 4 through members 37, and also prevent excessive stresses from being developed in rails 7 from differences in flexure between floor 2 and rails 7. Moreover, each brace member 37 and U-bolt 21 is located to exert a balanced force on a main bearing member 22, and each member 22 is connected by pins 17 to rail 7 so this force is transmitted uniformly to a rail 7, providing balanced and widely distributed forces on rail 7, preventing damage to the rail or its associated sidewall 4. The sidewalls 4 of the open-top vehicle are thus securely braced even if the load is taller than the sidewalls, and such a load also is securely braced against overturning.

On arrival at destination, it is a simple matter to remove the strands 19 in the conventional manner, then to remove the brace members 37, and finally to remove the bearing members 22 by lifting out the pins 17 and moving the bearing members 22 and their attached parts away from rails 7. The main bearing members 22 and their associated pads and auxiliary bearing members 32 are small enough so that they can be readily carried in an out-of-the-way place in the truck or trailer and also are inexpensive enough so that if desired they can be discarded without great economic loss.

Various modifications may be made in the above embodiment without departing from the invention. It is intended that the invention shall cover, by suitable expression in the appended claims, whatever features of patentable novelty reside in the invention.

I claim:
1. Means for bracing the sidewalls of an open-top vehicle having a floor and upstanding sidewalls having at their upper edge portions inwardly projecting flange portions having securing means, comprising opposed bearing means on the flange portions of said sidewalls, each of said bearing means extending longitudinally of the associated sidewalls for a substantial portion of the length thereof and having a portion bearing against the inner edge of said flange portion and an extending portion bearing against the underside of said flange portion; means engaging each of said bearing means and securing means of the associated flange portion to locate said bearing means relative to said flange portion; bracing members extending between the floor of the vehicle and each of said bearing means to exert on said bearing means outwardly directed forces; and means engaging opposed bearing means and extending therebetween to exert on said bearing means forces urging said sidewalls toward each other.

2. Means for bracing the sidewalls of an open-top vehicle having a floor and upstanding sidewalls having at their upper edge portions inwardly projecting flange portions having openings therein for securing purposes, comprising opposed bearing means on the flange portions of said sidewalls, each of said bearing means extending longitudinally of the associated sidewalls for a substantial portion of the length thereof and having a portion bearing against the inner edge of said flange portion and an extending portion bearing against the underside of said flange portion; means engaging each of said bearing means and an opening in the associated flange portion to locate said bearing means relative to said flange portion; bracing members extending between the floor of the vehicle and each of said bearing means to exert on said bearing means outwardly directed forces; and strand means engaging opposed bearing means and extending therebetween to exert on said bearing means tension forces to draw said sidewalls toward each other.

3. Means for bracing the sidewalls of an open-top vehicle having a floor and upstanding sidewalls having at their upper edge portions inwardly projecting flange portions having securing means, comprising opposed main bearing members on the flange portions of said sidewalls, each of said main bearing members extending longitudinally of the associated sidewalls for a substantial portion of the length thereof and having a portion bearing against the inner edge of said flange portion and an extending portion bearing against the underside of said flange portion; means engaging each of said main bearing members and securing means of the associated flange portion to locate said main bearing member relative to said flange portion; auxiliary bearing members resiliently engaging said main bearing members from below; a bracing member extending between the floor of the vehicle and each of said auxiliary bearing members to exert on said auxiliary bearing members an upwardly and outwardly directed force; and means engaging opposed main bearing members and extending therebetween to exert on said main bearing members forces tending to draw said sidewalls toward each other.

4. Means for bracing the sidewalls of an open-top vehicle having a floor and upstanding sidewalls having at their upper edge portions inwardly projecting flange portions having openings adapted to receive securing means, comprising opposed main bearing members on the flange portions of said sidewalls, each of said main bearing members extending longitudinally of the associated sidewalls for a substantial portion of the length thereof and having a portion bearing against the inner edge of said flange portion and an extending portion bearing against the underside of said flange portion; means engaging each of said main bearing members and an opening in the associated flange portion to locate said main bearing member relative to said flange portion; an auxiliary bearing member disposed at the extending portion of each of said main bearing members below and extending for a substantial portion of the length thereof; resilient means disposed between each of said auxiliary bearing members and its associated main bearing member; a bracing member extending between the floor of the vehicle and each of said auxiliary bearing members and disposed at an angle to the vertical to exert on each auxiliary bearing member an upwardly and outwardly directed force; and strand means engaging opposed main bearing members and extending therebetween to exert on said main bearing members tension forces tending to draw said sidewalls toward each other.

5. A vehicle wall bracing system comprising an open-top vehicle body having a floor and upstanding sidewalls having at their upper edge portions inwardly projecting flange portions having openings therein for securing purposes, opposed bearing means on the flange portions of said sidewalls, each of said bearing means extending longitudinally of the associated sidewalls of said vehicle for a substantial portion of the length thereof and having a portion bearing against the inner edge of said flange portion and an extending portion bearing against the underside of said flange portion; means engaging each of said bearing means and an opening in the associated flange portion to locate said bearing means relative to said flange portion; bracing members extending between the floor of the vehicle and said bearing means to exert on each bearing means an upwardly and outwardly directed force; a load supported by the floor of said vehicle body and extending above the sidewalls of said vehicle body; and strand means engaging opposed bearing means and extend therebetween and over said load to exert on said bearing means tension forces tending to draw said sidewalls toward each other.

6. A vehicle wall bracing system comprising an open-top vehicle body having a floor and upstanding sidewalls having at their upper edge portions inwardly projecting flange portions having openings therein for securing purposes, opposed main bearing members of the flange portions of said sidewalls, each of said main bearing members extending longitudinally of the associated sidewalls of said vehicle for a substantial portion of the length thereof and having a portion bearing against the inner edge of said flange portion and an extending portion bearing against the underside of said flange portion; means engaging each of said main bearing members and an opening in the associated flange portion to locate said main bearing member relative to said flange portion; an auxiliary bearing member disposed below the extending portion of each of said main bearing members and extending for a substantial portion of the length thereof; resilient means disposed between each of said auxiliary bearing members and its associated main bearing member; a bracing member extending between the floor of the vehicle and each of said auxiliary bearing members and disposed at an angle to the vertical to exert on each auxiliary bearing member an upwardly and outwardly directed force; a load supported by the floor of said vehicle body and extending above the sidewalls of said vehicle body; and strand means engaging opposed main bearing members and extending therebetween and over said load to exert on said main bearing members tension forces tending to draw said sidewalls toward each other.

References Cited by the Examiner

UNITED STATES PATENTS

| 1,519,319 | 12/24 | Manning | 105—367 |
| 2,940,402 | 6/60 | Hansen et al. | 296—3 X |

FOREIGN PATENTS

| 1,250,500 | 5/60 | France. | |

BENJAMIN HERSH, *Primary Examiner.*